United States Patent
Soudan

(10) Patent No.: US 8,052,815 B2
(45) Date of Patent: Nov. 8, 2011

(54) METHOD AND COMBINED SET COMPRISING A DEVICE AND A FILM MATERIAL FOR MANUFACTURING FOAM CUSHIONS

(75) Inventor: Freddy Soudan, Deinze (BE)

(73) Assignee: N.V. Soudan Patrimonium & Consulting, Deinze (BE)

( * ) Notice: Subject to any disclaimer, the term of this patent is extended or adjusted under 35 U.S.C. 154(b) by 7 days.

(21) Appl. No.: 12/225,724

(22) PCT Filed: Mar. 28, 2007

(86) PCT No.: PCT/BE2007/000031
§ 371 (c)(1),
(2), (4) Date: Sep. 21, 2009

(87) PCT Pub. No.: WO2007/109867
PCT Pub. Date: Oct. 4, 2007

(65) Prior Publication Data
US 2010/0038008 A1     Feb. 18, 2010

(30) Foreign Application Priority Data

Mar. 28, 2006  (BE) .................................. 2006/0198
Apr. 26, 2006  (BE) .................................. 2006/0247

(51) Int. Cl.
*B32B 41/00* (2006.01)
(52) U.S. Cl. .......................... 156/64; 156/360; 156/367

(58) Field of Classification Search ............. 156/64, 156/351, 360, 367; 425/46, 112, 115, 224; 264/46.6; 53/55, 282, 455
See application file for complete search history.

(56) References Cited

U.S. PATENT DOCUMENTS

| | | | |
|---|---|---|---|
| 5,000,725 A | 3/1991 | Bauknecht |
| 5,041,070 A | 8/1991 | Blaser |
| 5,357,733 A | 10/1994 | Weikert |
| 6,234,777 B1 | 5/2001 | Sperry |

FOREIGN PATENT DOCUMENTS
EP        1063168 A      12/2000

*Primary Examiner* — George R Koch, III
(74) *Attorney, Agent, or Firm* — Jacobson Holman PLLC

(57) ABSTRACT

Method and combined set comprising a device and a film material for manufacturing foam cushions, for packaging purposes in particular, a film feed station (2) comprising feeding a film material (9) to a foam feed station (3), the said film material having a first and a second sidewall (9-1, 9-2) which are each connected to a common first edge (16-1), the first and second sidewalls being arranged such that they demarcate an inner space which is accessible via an opening made in a second edge (16-2), the said foam feed station having first guiding devices (8) for guiding the second edge, the foam feed station also having a delivery device (12) to enter the said opening and inject a foaming substance into the inner space, a first welding device (5) which is equipped to make a seam weld in the film material, the film material being equipped with a series of characters (60) applied on the outside of each at a preset distance from one another, the method involving reading the said characters and generating a read pulse, a control device to receive the read pulses and to control a conveyor device as a function of those values.

13 Claims, 3 Drawing Sheets

Figure 1:
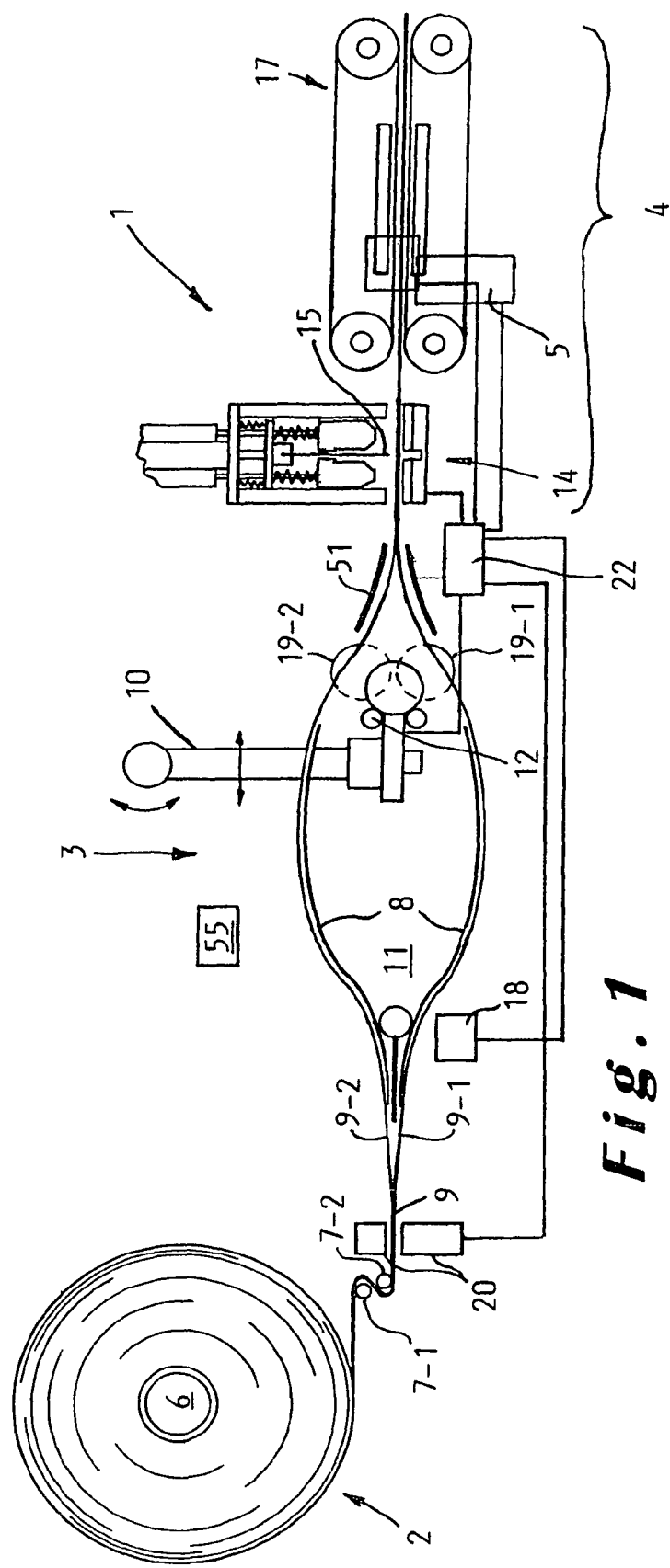

METHOD AND COMBINED SET COMPRISING A DEVICE AND A FILM MATERIAL FOR MANUFACTURING FOAM CUSHIONS

This is a national stage of PCT/BE2007/000031 filed Mar. 28, 2007 and published in English.

The invention concerns a combined set comprising a device for manufacturing foam cushions, and in particular for packing purposes, and a film material, the said device comprising a film feed unit and a foam feed unit, the said film feed unit being equipped to feed the film material to the foam feed unit, the said film feed unit having a first and second side wall which are each attached to a common first edge, the said first and second side walls being arranged such that they define an inner space which is accessible via an opening made in a second edge, the said foam feed unit having guides to guide the second edge, the said foam feed unit also comprising a delivery unit which is equipped to enter into that opening and feed a foaming substance into the said inner space, the said device also having conveyors which are equipped to carry the said film material through the foam feed unit to a first welding unit, the said first welding unit having a first welding device which is equipped to apply a closure weld to the said film material, the said film material being equipped with a series of characters which are applied to one or more of the side walls at a preset distance from one another in each case, the said device having a reading device for reading the said characters and generating a read pulse each time such a sign is read.

Such a combined set is described in previously submitted European patent application no. 05075783.0. The combined set described therein comprises a foam feed unit where a foaming substance is conveyed into the inner space formed by the film material. The film material is brought to the foam feed unit via the conveyor devices of the film feed unit, and from there to the first welding unit, where a seam weld is applied. The film material is equipped with a series of characters which are applied at a preset distance from one another. The reading device is equipped to read the characters and to generate a read pulse each time it reads a sign.

The invention differs from those described in the previously submitted European patent application no. 05075783.0 in that the device comprises a control device which is connected to the reading device and the conveyor devices, the said control device having an input for providing length information which indicates the length of the foam cushion to be produced, the said control device being equipped to determine a length based on the said length information which indicates how many consecutive read pulses the said length is equivalent to, the said control device also being equipped to receive the said read pulses and to control the conveyor device as a function of the said values. By providing length information and using this to determine a value by which the conveyor device is controlled, foam cushions of differing lengths can be produced.

A first preferential embodiment of a combined set as in the invention has the characteristic that the control device is also equipped to receive foam filling level information, which indicates the density of the foam in the foam cushion to be made, the said delivery device having a preset output for emitting the said foaming substance, the said control device being equipped, from the said foam filling level and the said output, to generate the said length information and a velocity value, the said velocity value indicating a velocity at which the film material is to be advanced through the conveyor devices, the said control device being linked to the said conveyor devices to provide the said velocity value, making it possible to vary the foam filling level even though the delivery device only has one output rate.

The said control device is preferably equipped with a memory for storing data words, each data word being formed by foam filling level information and associated length information and velocity value, eliminating the need to carry out a new calculation each time.

A second preferred embodiment of a combined set as in the invention has the characteristic that the said preset distance between two consecutive characters is the same each time. This makes determining the value simpler.

A third preferred embodiment of a combined set as in the invention has the characteristic that the said length information comprises a sequence of first and second segments, each first segment indicating a first length of the foam cushion to be made over which foam must be present in the foam cushion, and each second segment indicating a second length of the foam cushion to be made over which more or less no foam must be present in the foam cushion, the said control device being connected to the delivery device and is equipped to generate a first control signal under the control of the first segment and to generate a second control signal under the control of the second segment, the said delivery device being equipped to deliver foam under the control of the first control signal and to deliver virtually no foam under the control of the second control signal. This makes it possible to make a sequence of segments with and without foam in the foam cushion, obtaining a more economical foam cushion.

A fourth preferred embodiment of a combined set as in the invention has the characteristic that the control device is equipped to receive the first coordinates of an item to be packed, the said first coordinates determining the contours of the item, the said control device being equipped to receive second coordinates of a packaging in which the item is to be packed, the said second coordinates determining the contours of the packaging, the said control device being equipped to determine the said first and second segments on the basis of the said first and second coordinates. This makes it possible to determine a suitable sequence of first and second segments as a function of the item to be packed and the packaging.

A fifth preferred embodiment of a combined set as in the invention has the characteristic that the device has a second welding station which is installed upstream of the first welding station, the said second welding station comprising a second welding device which is equipped to make a seam weld between the first and second edges to connect the first and second side walls to one another, so that foam cushions of different widths can be made using the same film material.

A sixth preferred embodiment of a combined set as in the invention has the characteristic that the height of the second welding device can be varied, the said second welding station being connected to the control device, the said control device being equipped to receive a height signal, the said height signal indicating the distance at which the seam weld is to be applied in relation to one or more of the first or second edges, the said control device being equipped to determine a height pulse under the control of the height signal, the second welding station being controllable under the control of the height pulse, thus varying the width of the foam cushion.

Figure 2:
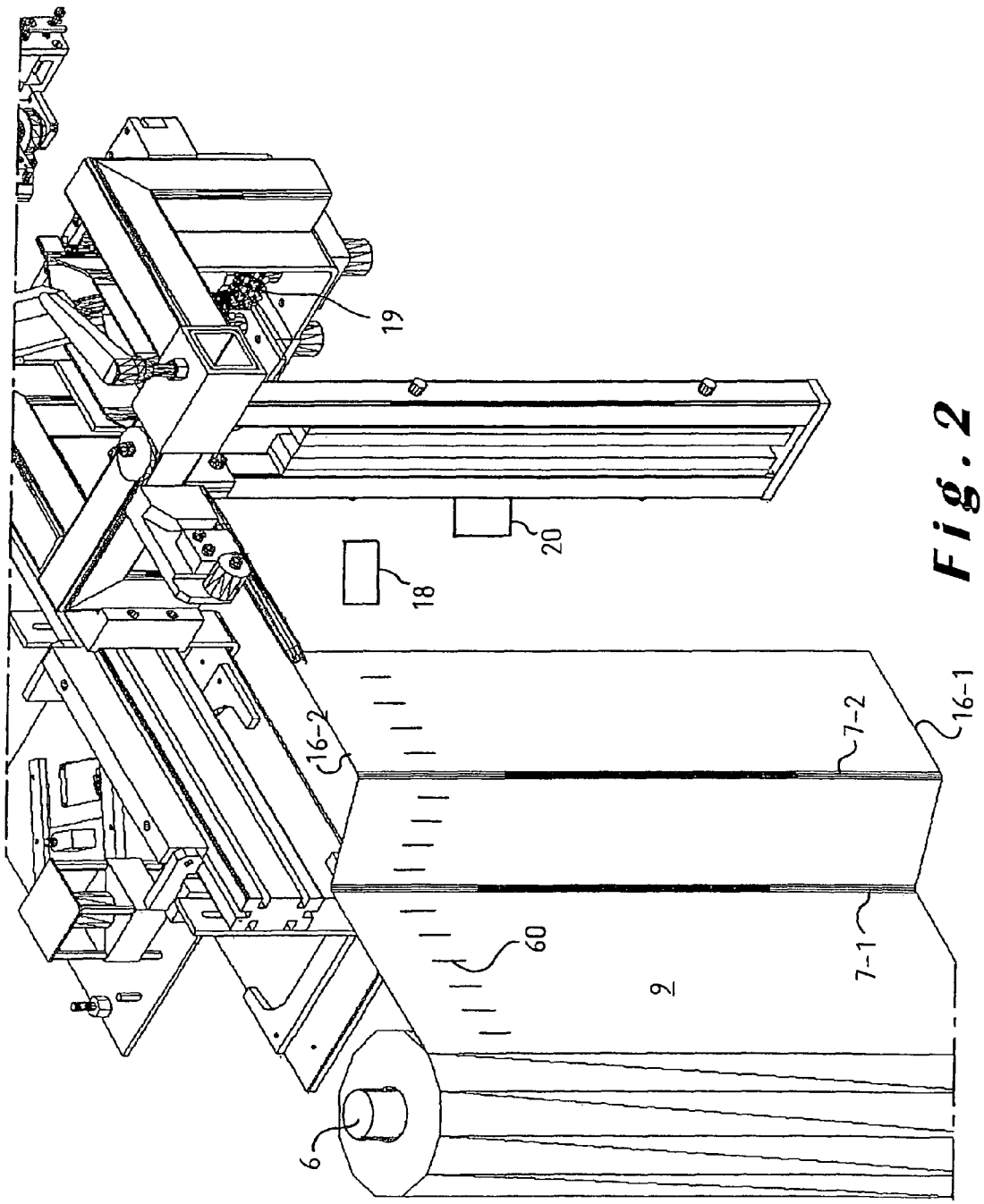
Figure 3:
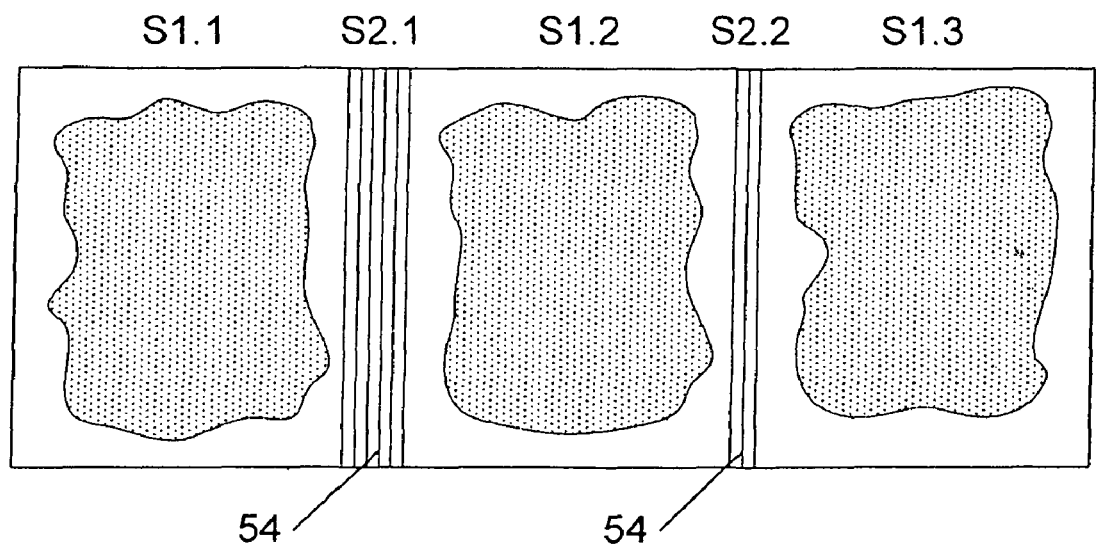
Figure 4:
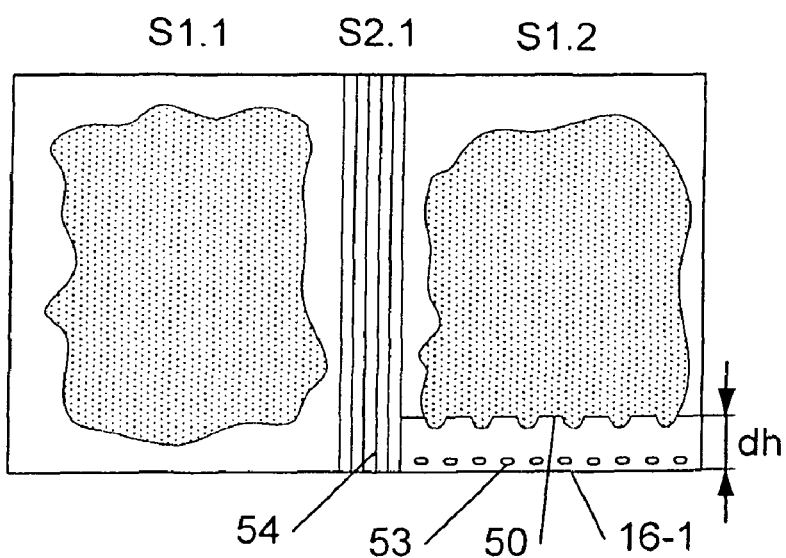

The invention will now be illustrated in more detail with the assistance of the drawing showing a preferred embodiment of the combined set as in the invention. In this drawing:

FIG. 1 is a top view of a combined set as in the invention;
FIG. 2 is a side view of a combined set as in the invention;
FIGS. 3 and 4 are a chain-shaped foam cushion.

The same key reference is used for the same or similar component in all the drawings.

The embodiments shown in the figures comprise components which are analogous to those in the corresponding figures of previously submitted European patent application no. 05075783.0, which are included here by way of reference.

The combined set shown in FIG. 1 comprises a device 1 for manufacturing foam cushions, for packaging purposes particularly. The combined set also comprises a film feed station 2 in which film material is wound on a reel 6, the said film feed station also being equipped to feed the film material to a foam feed station 3. The film material is preferably made of plastic, such as polyethylene, for example. The film material 9 has a first side wall 9-1 and a second side wall 9-2, each of which is attached to a common first edge 16-1. The first and second side walls are arranged such that they define an inner space which is accessible via an opening made in a second edge 16-2. The second edge is arranged opposite the first edge.

The film feed station 2 preferably includes a chicane device 7-1 and 7-2 affixed downstream of reel 6. The chicane device is equipped to make a chicane in the path which the film material follows, thus preventing forces being imposed on the film material from scratching the film at the film feed station.

The film material has a series of characters 60 which are applied on the outside of one or more of the side walls, each at a present distance from one another. The characters are preferably formed of bars printed on the film material, in black ink, for example. The characters are preferably so applied that the distance between two consecutive characters is always identical. This simplifies affixing the characters and using them so that characters can be used at multiples of the same distance.

The device also includes a foam feed station 3 which is equipped with first guiding devices 8 for guiding the second edge 16-2 at the entrance to the foam feed station. The foam feed station 12 also includes a delivery device which is equipped to enter the opening made in the second edge and insert a foaming substance in the space formed in the film material. The delivery device 12 preferably has a preset flow rate 12 at which the foaming substance is emitted. This flow rate is preferably constant, as a variable flow rate could form a source of problems and inaccuracies. The device also includes conveyor devices 17 which are equipped to carry the said film material through the foam feed station to a first welding station 4. The conveyor devices are equipped to carry the film material through the foam feed station at different speeds: with this in mind, they are equipped with a variable speed motor, for example. The first welding station comprises a first welding device 5 which is equipped to apply a seam weld in the second edge of the film material. The device also includes a reading device 18, equipped to read the said characters 60 and generate a read pulse each time a sign is read. The first welding station also includes a vertical 10 welding and cutting device 14 which is equipped to make a vertical weld in the film material and then cut the foam cushions off to length. Conveyor devices 17 also serve to carry the film material through the first welding station.

The device also includes a second welding station 20, which is fitted upstream of the first welding station 4, the second welding station having a second welding device which is equipped to make a seam weld between the first and second edges to bring the first side wall 9-1 and second side wall 9-2 together. The second welding device is preferably fitted to be variable in height. With this in mind, the second welding device is mounted on a track, for example, and equipped with a motor which drives a wheel, the said wheel riding on the track. The first and second welding devices are preferably analogous in design, although the two welding devices can be of different designs.

The device also includes a control device 22 which is connected to reading device 18, conveyor devices 17, the first and second welding devices 5, 20, the vertical welding and cutting device 14 and the foam feed station 12. The control device is equipped to generate length information (li) which indicates the length of the foam cushions to be made. The control device is equipped to determine a pulse sequence value based on the said length information which indicates how many consecutive read pulses are equal to the said length. The control device is also equipped to receive the said read pulses and to control the conveyor device as a function of the said pulse sequence value.

The length information can be generated by setting this in advance and entering it at an input 23 of the control device, which is formed for example by a microprocessor with associated memories and interfaces. The preset length information indicates the length of the foam cushions to be made. The length required for the foam cushion may be li=15 cm, for example. The control device converts this length information to the pulse sequence value which indicates how many consecutive read pulses must pass the read device while unrolling the film material to obtain the length desired. If a character 60 is present every 3 cm, for example, the control device will determine a pulse sequence value equal to 5 for the length information value 15 cm. In doing so, having generated the pulse sequence value, the control device will send a start pulse to the conveyor devices to start them. Control device 22 will then count the read pulses it receives from read device 18. If the number of counted read pulses received (five in this example) after starting counting corresponds to the pulse sequence value, the control device will stop conveyor devices 17 and activate vertical welding device 14 to apply the vertical weld and cut the foam cushion off. The foam will be inserted into the film material while it is being conveyed, of course.

The length information is preferably also determined on the basis of foam fill level information (ff) which indicates the density of the foam in the foam cushion to be made. In any case, the flow rate at which delivery device 12 emits the foaming substance is preferably preset and even more preferably still constant. By now varying the velocity at which the conveyor devices 17 carry the film material through the foam feed station and leaving the flow rate unchanged, the density of the foam in the foam cushions to be made can vary. With this in mind, the control device 23 must receive or know the foam fill level information. As a function of this foam fill level, and given the flow rate at which the delivery device emits the foaming substance, the control device will determine a velocity (v) at which the film material must be conveyed through the foam feed station. Assuming now that the flow rate is 1 l per minute, and that a fill level of 100% is achieved at a velocity of v=1 cm, if the foam fill rate is now 60%, velocity v must be speeded up to 1.66 cm per second. This carries the film material faster while the flow rate remains unchanged, which means that a greater volume of film material is filled with less foam. The control device will also determine the value of the length information as a function of the foam fill level. Returning to the example, the control device, knowing that a length of 15 cm, for example, was required for a 100% fill level, now calculates a length of 15×1.66=24.9 cm. The pulse sequence value is now 8.3. The control device will send the velocity value (v=1.66 cm/s) to the conveyor devices, which will then run the motor at a velocity to achieve that velocity. From the specified velocity value, the conveyor devices will carry the film material through the foam feed station at the velocity indicated by the velocity value. As the length information is also known, the read pulses will be counted again until the value as indicated in the length information is reached.

It is not necessary for the control device to determine the length information in each case. As the control device is equipped with a memory, it is possible to store data words in the memory, each data word being composed of a foam fill level (ff) and an associated length information (li) and velocity (v). It is therefore possible, if, for the same object in each case, the foam fill level (ff) is given and the associated length information (li) is determined and the velocity (v), to determine this value once. The values so determined are then stored as data words (ff, li, v) in the memory and given an identifier. It is then sufficient to state the identifier to enable the control device to fetch that information from the memory and use it. The data word may also be formed by a series of foam filling levels and associated length information and velocity data, which is necessary if the foam cushion is in the shape of a chain of connected cushions, as shown in FIG. 3, or consists of a series of loose cushions.

In a specific embodiment, the length information is preferably a sequence of first and second segments, in which each first segment s1$i$ indicates a first length of the foam cushions to be made over which there must be foam in the foam cushion, and each second segment s2$j$ indicates a second length of the foam cushions to be made over which virtually no foam must be present in the foam cushions. FIG. 3 shows an example in which the foam cushion is comprised of three segments. Segments s1.1, d1.2 and s1.3 comprise foam, while segments s2.1 and s2.2 do not comprise any foam. The foam fill level ff for each segment may be different, of course. The control device is equipped, in controlling the first segment, to generate a first control signal and to generate a second control signal in controlling the second segment. The delivery device is equipped to supply foam under the control of the first control signal and not to deliver virtually any foam under the control of the second control signal. This makes a foam cushion which forms a chain, as it were, in which there are first segments in which foam is in the cushion and second segments where there is no foam in the cushion. As the first and second segments each comprise a length which is to be taken up via the characters on the film material, the control device can monitor and control this length via the read pulses and values. The advantage of a foam cushion which comprises segments with and without foam is that it only puts foam in the places where it is really necessary. The quantity of foam used can thus be reduced without compromising on the quality of the packaging, giving a more economical solution.

The control device is preferably equipped to receive initial coordinates of an item to be packaged via input 23. The initial coordinates define the item's contours. For example, the initial coordinates give the height, length and width of the item. The initial coordinates can also indicate specific contour lines of the item. The control device is equipped to receive second coordinates of a packaging in which the item is to be packed, these second coordinates defining the contours of the packaging. The control device is equipped to determine the said first and second segments from the said initial and second coordinates. The control device can therefore determine what the length of the first and second segments is to be itself, and hence work more efficiently. In this way, the control device will determine the corners of the item from the coordinates and ensure that the first segments correspond to the corners. The coordinates of the packaging make it possible to determine how much foam to inject in each segment as a function thereof. The length information thus obtained, linked to a foam fill level as the case may be, is also to be stored as a data word in the memory.

The control device is also preferably equipped to receive a height signal via the input 23, the said height signal indicating the distance, that is, in relation to one or more of the two edges, where the seam weld is to be made. The control device is equipped, under the control of the height signal, to define a height pulse and send it to the second welding device 20. If the second welding device is adjustable, it will set itself to the height indicated by the height pulse under the height pulse's control. Should the height pulse indicate that the seam weld is to be made at dh=10 cm from the first edge, the control device will generate a height pulse which sets the second welding device at 10 cm from the first edge 16-1 before making the seam weld. As the second welding device is fitted upstream of the foam feed station 12, the seam weld is made before the foam is inserted. FIG. 4 shows a foam cushion in which segment s1.2 has a seam weld made at a height dh of the first edge 16-1. As the seam weld is present at distance dh, the foam cannot fall to the first edge 16-1, and a foam cushion of a smaller width is obtained, even though starting from a film material of the same standard dimensions. This method thus makes it possible to obtain foam cushions of different widths from one and the same film material.

In the example shown in FIG. 4, the seam weld 50 is applied at a distance from the first edge, formed by a discontinuous weld, i.e. there are welded and unwelded sections. The advantage with such a discontinuous weld is that foaming substance can penetrate at the places where the unwelded sections are located, giving a toothed profile which may be beneficial for certain packaging. The weld may also be made continuously, of course.

The device also includes a pressure plate 51 which comprises two wings and which is located on either side of the film material, downstream of foam feed device 12. Pressure plate 51 is preferably spring-mounted and fitted matching the height at which the second edge 16-2 of the film material passes, and extends over a height of, for example, 5 to 10 cm. Once the film material has been filled with foam and the vertical weld applied and cut through, this pressure plate holds the foam cushion in place, thus preventing the foam cushion which has just been filled falling under the influence of gravity. As FIG. 4 shows, it is also possible to make a series of perforations 53, preferably micro-perforations, slightly above the first edge 16. These can be made, for example, by a toothed wheel mounted next to the second welding device. This toothed wheel has point-shaped teeth which perforate the film material. These perforations allow gases which arise in the foam to escape.

As FIGS. 3 and 4 also show, it is possible to make one or more vertical seam welds in the sections of the second segment s2$j$ using the welding device 14 without cutting through the film material. These vertical seam welds distinguish segments without foam clearly from those with foam.

The device may also include a foam generating station 55 to which the delivery device 12 is taken now and then or regularly to make the foam, thus preventing foam residues from adhering. The foam generating station has a stock of solvent for this purpose. The quality of the solvent is monitored via a photocell which monitors its colour. Adding the foaming substance will always discolour the solvent. If the photocell finds that the discolouration exceeds a set threshold value, a signal is emitted which indicates that the solvent must be replaced.

The invention claimed is:

1. Combined set comprising a device for manufacturing foam cushions, in particular for packaging purposes, and a film material, the said device having a film feed station (2) and a foam feed station (3), the said film feed station being equipped to feed the film material to the foam feed station, the said film material having a first (9-1) and second (9-2) side wall which are each attached to a common first edge (16-1), the said first and side walls being arranged such that they demarcate an inner space which is accessible via an opening made in a second edge (16-2), the said foam feed station having guiding devices (8) for guiding the second edge, the said foam feed station also having a delivery device (12) to enter the said opening and put a foaming substance into the said inner space, the said device also having conveyor devices (17) which are equipped to carry the said film material through the foam feed station to a first welding station (4), the said first welding station having a first welding device (5) which is equipped to make a seam weld in the said film material, the said film material being equipped with a series of characters (60) which are applied on one or more of the side walls each at a preset distance from one another, the said device having a reading device (18) for reading the said characters and generating a read pulse whenever it reads a character, characterised in that the device has a control device (22) which is connected to the read device and conveyor devices, the said control device being equipped to generate a length information which indicates the length of the foam cushions to be made, the said control device being equipped, based on the said length information, to determine a value which indicates the number of consecutive read pulses to which the said length corresponds, the said control device also being equipped to receive the said read pulses and to control the conveyor device as a function of those values.

2. Combined set as in claim 1, characterised in that the control device is also equipped to receive foam fill level information which indicates the density of the foam in the foam cushion to be made, the said delivery device having a preset flow rate for emitting the said foaming substance, the said control device being equipped, from the said foam fill level and the said flow rate, to generate the said length information and a velocity value, the said velocity value indicating the velocity at which the film material is to be advanced by the conveyor devices, the said control device being connected to the said conveyor devices to emit the said velocity value.

3. Combined set as in claim 1, characterised in that the said control device is equipped with a memory for storing data words, each data word being formed by a foam fill level information and an associated length information and velocity value.

4. Combined set as in claim 1, characterised in that the said preset distance between two consecutive characters is always the same.

5. Combined set as in claim 1, characterised in that the said length information comprises a sequence of first and second segments, in which each first segment indicates a first length of the foam cushion to be made in which there must be foam in the foam cushion and each second segment indicates a length of the foam cushion to be made in which there must be virtually no foam in the foam cushion, the said control device being connected to the delivery device to generate a first control signal under the control of the first segment and to generate a second control signal under the control of the second segment, the said control device being equipped to deliver foam under the control of the first control signal and to deliver virtually no foam under the control of the second control signal.

6. Combined set as in claim 5, characterised in that the control device is equipped to receive initial coordinates of an object to be packed, the said initial coordinates defining the contours of the object, the said control device being equipped to receive second coordinates of a packaging in which the object is to be packed, the said second coordinates defining the contours of the packaging, the said control device being equipped to determine the said first and second segments from the said initial and second coordinates.

7. Combined set as in claim 1, characterised in that the combined set has a second welding station 20, arranged upstream of the first welding station, which is equipped to make a seam weld between the first and second edge to connect the first and second side walls to one another.

8. Combined set as in claim 7, characterised in that the second welding device is installed to be variable in height.

9. Combined set as in claim 8, characterised in that the second welding device is connected to the control device, the said control device being equipped to receive a height signal, the said height signal indicating the distance with respect to one or more of the first or second edges at which the seam weld is to be made, the said control device being equipped, under the control of the height signal, to determine a height pulse and the said second welding device being adjustable under the control of the height pulse.

10. Combined set as in claim 7, characterised in that the said seam weld is formed by a succession of welded and unwelded sections.

11. Combined set as in claim 1, characterised in that the device has a perforating device which is installed close to a place where the said first edge comes along and is equipped to make perforations in the film material.

12. Method for manufacturing foam cushions, for packaging purposes in particular, the said film feed comprising feeding a film material to a foam feed station (3), the said film material having a first (9-1) and a second (9-2) sidewall which are each connected to a common first edge (16-1), the said first and second sidewalls being arranged such that they demarcate an inner space which is accessible via an opening made in a second edge (16-2), in which foam feed a foaming substance is injected into the said inner space, the said film material being equipped with a series of characters (60) applied on an outside of one or more of the sidewalls each at a preset distance from one another, the said method involving reading the said characters and generating a read pulse each time a character is read, characterised by the fact that length information indicating the length of the foam cushion to be made is determined, indicating how many consecutive read pulses the said length corresponds to, and in which the said read pulses are compared with the said value to make the foam cushion to the said length.

13. Method as in claim 12, characterised in that a height signal is emitted, the said height signal indicating the distance relative to one or more of the first or second edges at which a seam weld is to be applied, the said seam weld being applied under the control of the height signal.

* * * * *